United States Patent
Trapp et al.

(10) Patent No.: US 7,320,333 B2
(45) Date of Patent: *Jan. 22, 2008

(54) COMPACT FIELD ADJUSTABLE PRESSURE REDUCING VALVE

(75) Inventors: James M Trapp, Galien, MI (US); Eric Combs, Goshen, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 277 days.

This patent is subject to a terminal disclaimer.

(21) Appl. No.: 11/124,986

(22) Filed: May 9, 2005

(65) Prior Publication Data

US 2006/0249206 A1    Nov. 9, 2006

(51) Int. Cl.
*G05D 16/00* (2006.01)

(52) U.S. Cl. .................... 137/14; 137/495; 137/505.26; 137/505.28

(58) Field of Classification Search ............ 137/495 X, 137/145, 505, 505.26 X, 505.27, 505.28 X, 137/505.25
See application file for complete search history.

(56) References Cited

U.S. PATENT DOCUMENTS

| | | | |
|---|---|---|---|
| 1,984,792 A | 12/1934 | Ford | |
| 2,053,611 A * | 9/1936 | Hill | 137/495 |
| 3,253,611 A * | 5/1966 | Cummins | 137/338 |
| 3,392,749 A | 7/1968 | Gneiding et al. | |
| 3,946,756 A * | 3/1976 | Specht | 137/495 |
| 4,008,735 A | 2/1977 | Thompson | 137/495 |
| 4,100,933 A | 7/1978 | Davey et al. | |
| 4,173,986 A * | 11/1979 | Martin | 137/613 |
| 4,276,902 A | 7/1981 | Roth | |
| 5,358,004 A | 10/1994 | Atkinson et al. | |
| 5,662,139 A | 9/1997 | Lish | |
| 2006/0112994 A1* | 6/2006 | Trapp | 137/495 |

* cited by examiner

*Primary Examiner*—Stephane M. Hepperle
(74) *Attorney, Agent, or Firm*—Van Dyke, Gardner, Linn & Burkhart, LLP

(57) ABSTRACT

A pressure reducing valve for coupling to a pressurized water supply line includes a valve body with an inlet for coupling to the pressurized water supply line, an outlet, a passage extending between the inlet and the outlet, and a valve seat in the passage. A valve stem extends into the passage, which has a sealing member. An automatic pressure reducing system is provided for urging the sealing member toward the valve seat for throttling the valve to thereby reduce the pressure at the outlet. The automatic pressure reducing system includes parallel springs that occupy less space than conventional springs for a given spring load.

21 Claims, 3 Drawing Sheets

COMPACT FIELD ADJUSTABLE PRESSURE REDUCING VALVE

This application incorporates by reference herein application entitled PRESSURE REDUCING VALVE, filed Nov. 30, 2004, U.S. Ser. No. 10/999,789.

TECHNICAL FIELD AND BACKGROUND OF THE INVENTION

The present invention relates to a field adjustable pressure reducing valve that is particularly useful, for example, in a high-rise building application in a fixed fire protection system.

In high-rise buildings, the riser pipe of the fire protection system, which is typically located in a stairwell of the building, operates with a relatively high pressure in order to have a sufficient operating pressure at the highest elevation of the building. When firefighters need to access the water in these fire protection systems, for example in the riser pipe, the pressure in the system typically exceeds the maximum pressure ratings for the fire protection components. In addition, at the lower elevations, the pressure may exceed pressure ratings for the sprinkler piping components.

In order to reduce the pressure, fire protection systems have incorporated pressure reducing valves, which reduce the pressure at the valve and are located at intermediate elevations along the riser so that the water pressure is reduced at these locations to acceptable levels for firefighting equipment and for the sprinkler piping. To reduce the pressure, pressure reducing valves incorporate springs that counteract the pressure exerted on the valve piston generated, for example, in the riser pipe.

Because pressure reducing valves used in fire suppression applications deal with relatively high pressures (greater than 175 psi), the force required by these springs may often be quite large, for example, on the order of up to 2000 to 3000 lbs. To generate these large spring forces, however, the springs are relatively large in height. The larger height equates to more coils to distribute stress load. For example, in some applications, the spring may be 6 inches or taller.

However, the large height of the spring creates multiple problems. For example, with the taller springs, the size of the valve, which encloses the spring, is necessarily increased. Hence, the weight of the valve can be significant. Also, with increased size comes increased material cost. In addition, pressure reducing valves for the fire suppression industry are constructed of brass, which is cast. Hence, in addition to the material cost increase, the cost for the casting process and casting equipment will increase. The added weight and bulk of the valve also results in the valve being more difficult to handle and, therefore, also increases the shipping and handling costs. The large size of the valve also makes it impractical to use in a tight area—therefore, its use may be limited in some applications or locales. As a result, many contractors will not use field adjustable pressure reducing valves because of these size/weight issues.

Consequently, there is a need for a pressure reducing valve with a more compact configuration, without comprising the function of the pressure reducing valve.

SUMMARY OF THE INVENTION

The present invention relates to a pressure reducing valve that has a more compact configuration while still providing the reduction in pressure for application in a high rise protection system.

In one form of the invention, a pressure reducing valve for coupling to a pressurized water supply line includes a valve body with an inlet for coupling to the pressurized water supply line, an outlet, a passage extending between the inlet and the outlet, and a valve seat in the passage. A valve stem extends into the passage, which has a sealing member. An automatic pressure reducing system is provided for urging the sealing member toward the valve seat for throttling the valve to thereby reduce the pressure at the outlet and includes a spring assembly and a piston mounted to the valve stem. The valve is configured so that the water pressure at the inlet is directed to a chamber in the valve where the piston is located to apply pressure on the piston. The pressure on the piston applies a load on the valve stem to urge the sealing member toward the valve seat to thereby automatically adjust the pressure at the outlet. The spring assembly, which includes parallel first and second springs, is coupled to the valve stem and generates a spring force opposed to the pressure on the piston to adjust the load on the piston and to thereby adjust the pressure at the outlet.

In one aspect, one of said springs comprises a left-hand coiled spring and another of said springs comprises a right-hand coiled spring.

In further aspects, the springs are preferably nested. For example, the inner spring may comprise the left-hand coiled spring, and the outer spring may comprise the right-hand coiled spring. For example, each spring may have 4 to 7 coils, depending on the diameter of the spring's wires. Each spring may have an overall height in a range of about 2 inches to 5 inches, more typically, in a range of about 3 to 4 inches, and, most typically for a spring assembly generating a spring force in a range of 1700 to 2300 lbs., each of the spring heights is preferably in a range of about 3.2 to 3.8 inches.

The diameter of the spring wires may vary as well. For example, the diameters may vary from about 0.2 to 0.6 inches. In addition, the inner spring's wire may vary from the outer spring's wire diameter. For example, the inner spring wire diameter may fall in a range of about 0.2 to 0.4 inches, more typically about 0.3 to 0.4 inches and, most typically for spring compression loads of about 1700 to 2300 lbs., in a range of about 0.28 to 0.35 inches. The outer diameter spring wire diameter may fall in a range of about 0.3 to 0.6 inches, more typically about 0.4 to 0.5 inches and, most typically for resulting spring compression loads of about 1700 to 2300 lbs., in a range of about 0.4 to 0.5 inches.

According to another form of the invention, a pressure reducing valve for coupling to a pressurized water supply line includes a valve body with an inlet for coupling to the pressurized water supply line, an outlet a passage extending between the inlet and the outlet, and a valve seat in the passage. The valve also includes a valve stem that extends into the passage and a sealing member coupled to the valve stem. An automatic pressure reducing system is provided for urging the valve stem and the sealing member toward the valve seat for throttling the valve to thereby automatically reduce the pressure at the outlet. The automatic pressure reducing system includes a piston mounted to valve stem and nested springs. Water pressure from the pressurized water supply line is directed to the chamber where the piston is located and applies pressure on the piston to apply a load on the valve stem to urge the sealing member toward the valve seat to adjust the pressure at the outlet. The springs are coupled to the valve stem and generate a spring force opposed to the pressure on the piston to adjust the load on the valve stem and to thereby adjust the pressure at the outlet.

In any of the above pressure reducing valves, the valve may include a manual override system to move the valve stem and urge the sealing member toward or away from the valve seat. The manual override system may comprise a manual override system that is decoupled from the automatic pressure reducing system. In one form, the manual override system includes a hand operable member, which is coupled to the valve stem and is movable to urge the sealing member toward the valve seat but with the movement of the hand operable member decoupled from the pressure on the piston and the spring force of the spring assembly.

In one form, the valve stem may include a first valve stem portion, which coupled to the piston and the spring assembly, and a second valve stem portion, which coupled to the hand operable member. In addition, the second valve stem portion may be guided by the first valve stem portion and movable relative to the first valve stem portion. For example, the first valve stem portion may comprise an outer valve stem portion, with the second valve stem portion comprising an inner valve stem portion guided in the outer valve stem portion.

According to yet another form of the invention, a method of closing a pressure reducing valve, which includes a valve body, a valve stem with a sealing member, and an automatic pressure reducing system in the valve body for urging the sealing member toward the valve seat for throttling the valve to thereby reduce the pressure at the outlet, includes providing the automatic pressure reducing system with a spring assembly that includes two or more parallel springs to reduce overall size of the valve body and, optionally, the stress level on the springs.

In one form, the springs are nested, with each spring coupled to the valve stem.

Accordingly, the pressure reducing valve of the present invention offers a more compact valve arrangement while achieving the same or similar spring loads associated with conventional pressure reducing valves. In addition, with the spring assembly configuration of the present invention, the stress in the springs may be lower than conventional spring designs with comparable spring loads.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
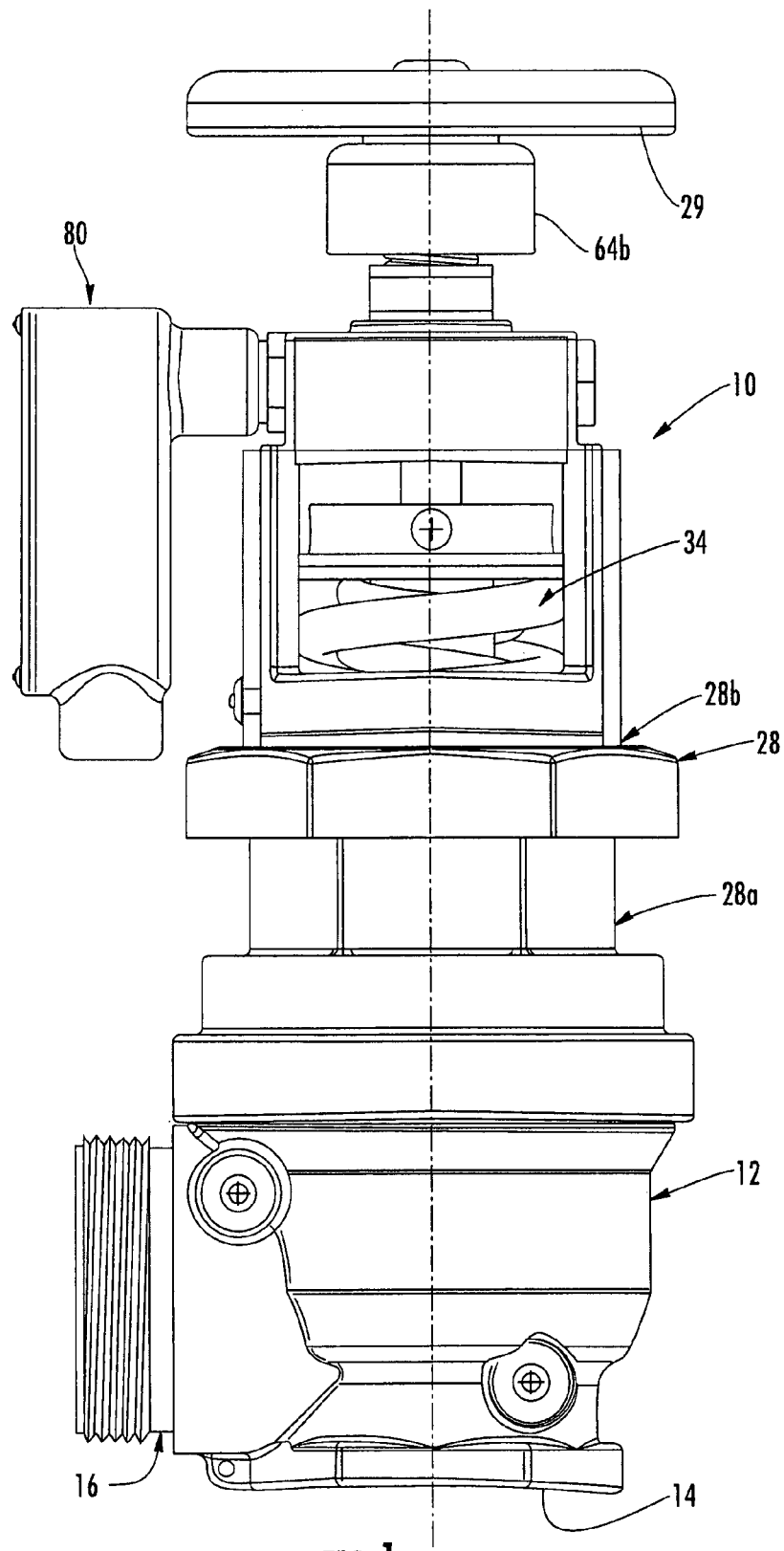
FIG. 1 is an elevation view of the pressure reducing valve of the present invention.
Figure 2:
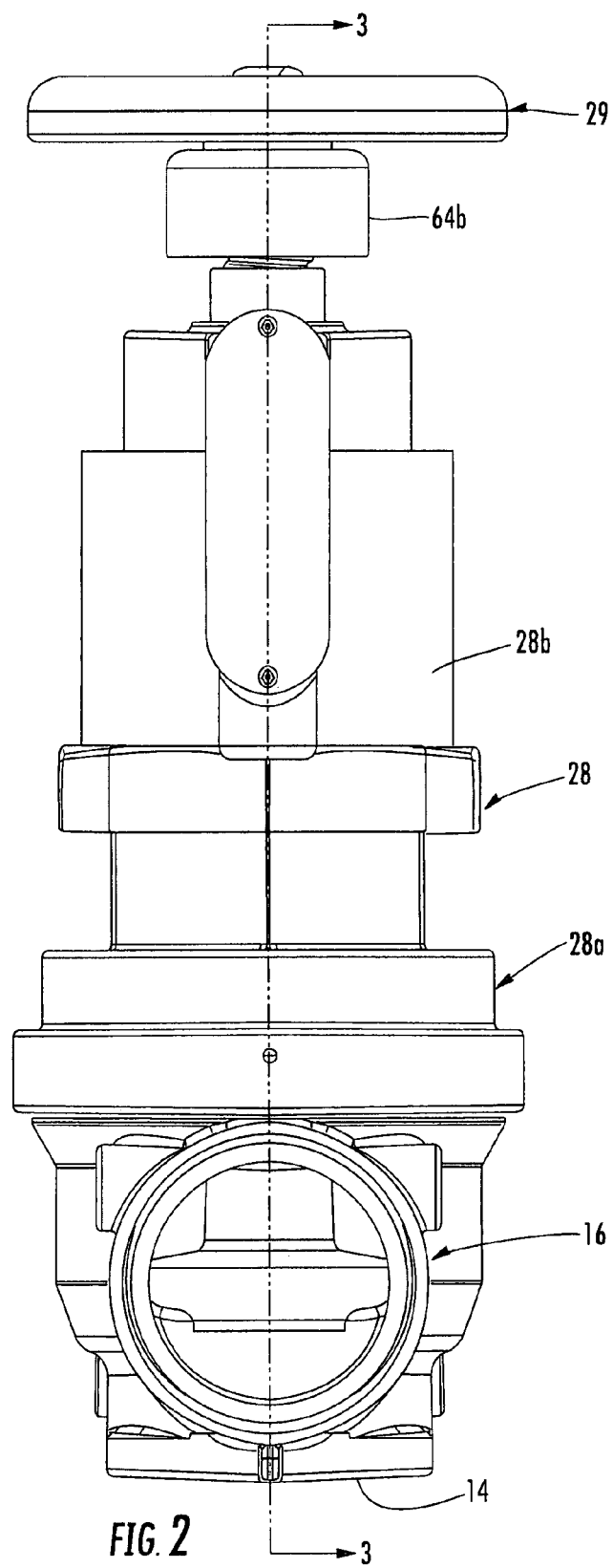
FIG. 2 is a side view of the pressure reducing valve of FIG. 1.
Figure 3:
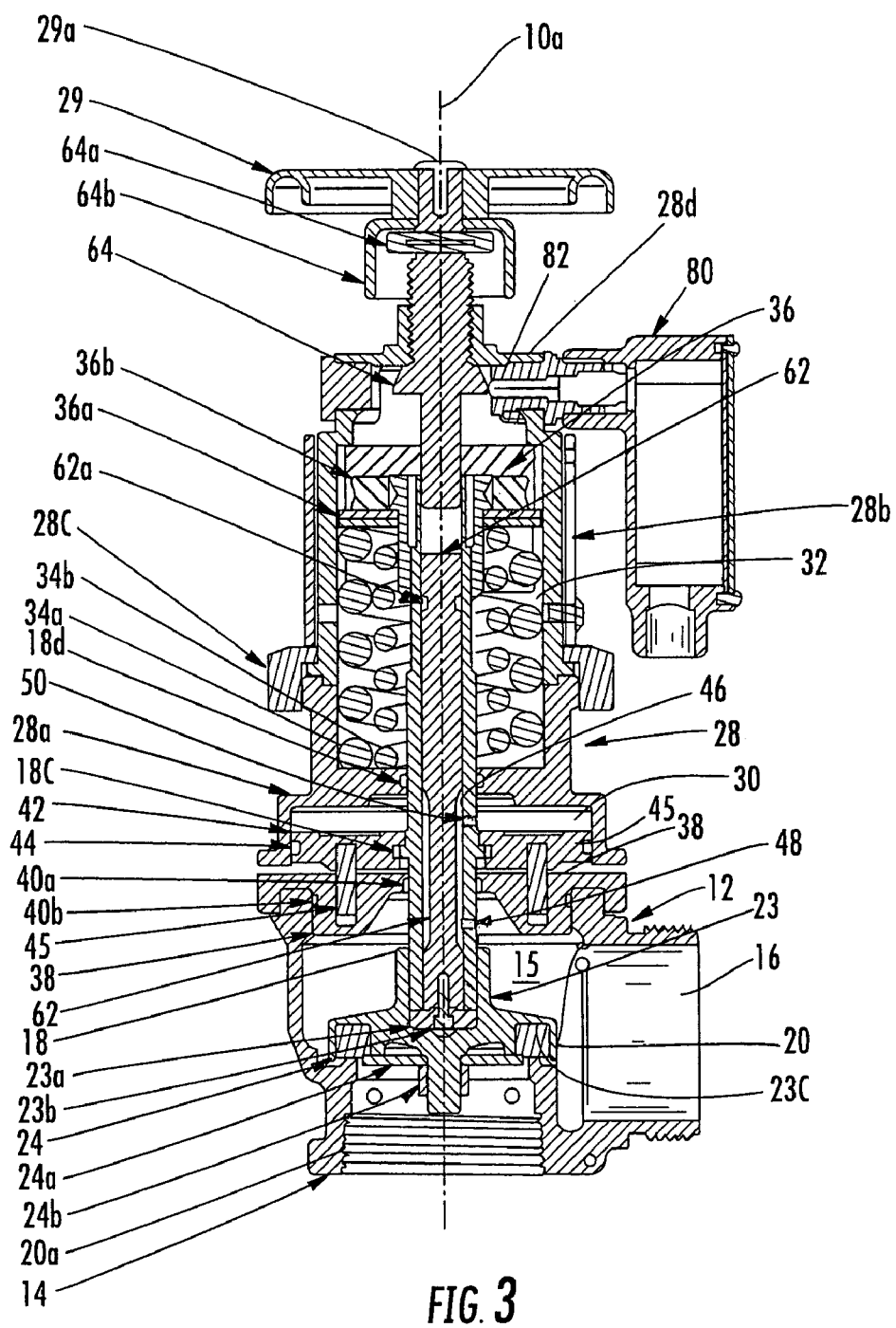
FIG. 3 is a cross-section view taken along line III-III of FIG. 1.

Referring to FIGS. 1-3, the numeral 10 generally designates a field adjustment pressure reducing valve of the present invention. Pressure reducing valve 10 is adapted to reduce the pressure in a pipe that is subject to high pressures, for example a riser pipe in a fire protection system. In riser pipes, the water pressure is often high in order to deliver water at a suitable operating pressure at higher elevations but is too high to permit firefighting equipment to be directly coupled to the riser pipe at the lower elevations. As will be more fully described below, valve 10 is configured to have a more compact arrangement than conventional valves and may be configured to facilitate opening of the valve such as described in copending application entitled PRESSURE REDUCING VALVE, filed Nov. 30, 2004, Ser. No. 10/999, 789, which is incorporated by reference herein in its entirety and commonly owned by Elkhart Brass Manufacturing of Elkhart, Ind.

As best seen in FIG. 3, valve 10 includes a valve body 12 with an inlet 14 and an outlet 16 and a housing 28. Inlet 14 and outlet 16 are in selective communication by way of a passageway 15 that extends through body 12. In the illustrated embodiment, inlet 14 is internally threaded for coupling to a pipe, such as a water supply pipe of a fire protection system, while outlet 16 is externally threaded for coupling to a fire hose or may be internally threaded for coupling to a pipe, such as sprinkler piping. Positioned in body 12 and in passageway 15 is a valve stem 18 and a valve member 20, which is mounted to the distal end of valve stem 18 and aligned over a valve seat 22 formed or otherwise provided in body 12. As will be more fully described below, valve 10 includes a compact automatic pressure reducing system and a manual override system for opening or closing the valve, which is optionally decoupled from the automatic pressure reducing system as described in the referenced patent.

Valve member 20 includes an annular body 23, which is mounted to the distal end of valve stem 18 by a push rod guide 23a and a fastener 23b, and a gasket 24, such as an annular rubber gasket, for selectively sealing inlet 14 when valve stem 18 urges valve member 20 to seal against seat 22. Gasket 24 is mounted in annular body 23 in an annular groove 23c by a washer 24a and a nut 24b, which are mounted on stem 20a of valve member 20.

Valve stem 18 extends from body 12 and into housing 28 for coupling to a hand wheel 29, described more fully below. Housing 28 includes a lower housing portion 28a, which defines a chamber 30, and an upper portion 28b, which includes a passageway 32 and houses the upper portion of valve stem 18, a spring assembly 34, and an adjustment member 36. Upper housing portion 28a is mounted to lower housing portion 28b by a collar 28c that is mounted to upper housing portion 28a on threads onto lower housing portion 28b. As will be more fully described below, spring assembly 34 is configured to have a more compact configuration than springs of comparable stiffness or spring loads so that housing 28 and, hence, valve 10 may have a more compact configuration.

In the illustrated embodiment, lower portion 28a of housing 28, which forms cavity or chamber 30, is threaded onto body 12. Positioned between lower portion 28a of housing 28 and body 12 is an annular member 38, which separates passage 15 from chamber 30 and includes a central opening 38a through which valve stem 18 extends into body 12 to provide a guide for valve stem 18. To seal opening 38a, a seal 40a, such as an O-ring seal, is mounted in member 38 at opening 38a. A second seal 40b is provided in member 38 at its interface with body 12.

Positioned in chamber 30 and secured to valve stem 18 is a piston 42, which includes an annular seal 44 at its perimeter, such as an O-seal, and is coupled to stem 18 by an annular shoulder 18b formed or otherwise provided on stem 18. In addition, piston 42 includes a threaded portion 42a for engaging a corresponding threaded portion 19 provided on stem 18. Further, to limit rotation of piston 42, and in turn stem 18 about axis 10a (FIG. 3), piston 42 is rotationally coupled to annular member 38, for example, by one or more pins 45. By rotationally coupling stem 18 to member 38, and in turn valve body 12, adjustment of the preload on the spring assembly 34 can be achieved with minimal, if any, rotation of the valve stem. While this rotation may not be significant in some valves, valves that generate spring loads on the order of 2000 to 3000 lbs. can have significant rotation of their valve stems when adjusting the spring load, which hampers the ability to provide field adjustment of the valve.

Stem 18 also includes an annular seal 18c to seal piston 42 against stem 18 and a seal 18d for sealing stem 18 in the bottom wall of upper housing 28b. Piston 42 and, hence, stem 18 are movable so that piston 42 moves between an upper position (not shown) and a lower position (shown in FIG. 3) in which piston 42 is adjacent annular member 38 and valve stem 18 is urged downward to seal valve member 20 against seat 22. As would be understood, the position of piston 42 is controlled by the pressure of fluid flowing into inlet 14, which is directed into cavity 30 above piston 42 through valve stem 18, and by spring assembly 34, which varies the load on the piston to adjust the pressure at outlet 16. As will understood by those skilled in the art, the position of valve stem 18 and, hence, valve member 20 is controlled at least in part by the input pressure from the water entering inlet 14 that is directed above piston 42, which tends to close the valve in response to the inlet pressure and, therefore, throttles the valve. Spring assembly 34, however, is used to vary the load on the piston to adjust the pressure at outlet 16.

In the illustrated embodiment, spring assembly 34 includes at least two parallel springs 34a, 34b and, more preferably, at least two nested, parallel springs such that their spring constants are additive. It should be understood that spring assembly 34 may include more than two parallel springs. Further, springs 34a, 34b are arranged so that one of the springs (outer or inner) is a left-hand coiled spring while the other spring is a right-hand coiled spring. In the illustrated embodiment, inner spring 34b is the left-hand coiled spring, with outer spring 34a as the right-hand coiled spring.

For example, the springs may each have 4 to 7 coils, depending on the diameter of the spring's wire. The overall height of each spring falls in a range of about 2 to 5 inches and, more typically, in a range of about 3 to 4 inches. Most typically for springs generating a spring rate in a range of about 1700 to 2300 lbs., each of the spring heights is preferably in a range of about 3.2 to 3.8 inches. However, it should be understood that the number of coils and these dimensions may vary, especially when smaller or larger spring loads are desired. In addition, with the spring assembly configuration of the present invention, the stress in the springs may be lower than conventional spring designs with comparable spring loads. For example, for a spring assembly of the present invention with two nested springs, with the inner spring having 5 coils and a wire thickness of about 0.31 inches and the outer spring with 4 coils having a wire thickness of about 0.45 inches and with the spring assembly having an overall height of about 3.4 inches, the maximum stress in each of the springs is about 50 percent of ultimate tensile stress, as compared to a stress level of about 60-65 percent of ultimate tensile stress in a conventional 6" spring with 8 coils.

Further, the spring assembly of the present invention has a greater ratio of allowable deflection to overall spring height before reaching the shut height (the fully compressed height of the spring where the spring no long acts like a spring in the compression direction) than conventional spring designs currently being used. For example, for a spring assembly of the present invention with two nested springs, with the inner spring having 5 coils and a wire thickness of about 0.31 inches and the outer spring with 4 coils with a wire thickness of about 0.45 inches, and with the spring assembly having an overall height of about 3.4 inches, the ratio of allowable deflection to overall spring height before reaching the shut height is about 50 percent. While the ratio for a conventional 6" spring with 8 coils is on the order of about 33 percent.

The diameter of the spring wires may vary as well. For example, the diameters may vary from about 0.2 to 0.6 inches. In addition, the inner spring's wire may vary from the outer spring's wire diameter. For example, the inner spring wire diameter may fall in a range of about 0.2 to 0.4 inches, more typically about 0.3 to 0.4 inches and, most typically for resulting spring compression load of about 1700 to 2300 lbs., in a range of about 0.28 to 0.35 inches. The outer diameter spring wire diameter may fall in a range of about 0.3 to 0.6 inches, more typically about 0.4 to 0.5 inches and, most typically for resulting spring compression load of about 1700 to 2300 lbs., in a range of about 0.4 to 0.5 inches.

As noted above, the inlet pressure is directed into chamber 30 above piston 42 by valve stem 18. In the illustrated embodiment, valve stem 18 includes a passageway 46, which is in fluid communication with passageway 15 by way of opening 48 and in fluid communication with chamber 30 above piston 42 by way of opening 50. In this manner, when inlet 14 is opened, water will flow into chamber 15 and into valve stem 18 and then into chamber 30 above piston 42. This water pressure then urges piston 42 downward (as viewed in FIG. 3) and tends to throttle or close the valve. However, as noted above, spring assembly 34 generates a spring force that counteracts the pressure on piston 42. In the illustrated embodiment, springs 34a, 34b are compressed between adjustment member 36 and lower end 28c of upper portion 28b of housing 28. Adjusting member 36 is mounted on valve stem 18 and includes a pair of washers 36a and a threaded annular nut 36b that threads onto stem 18 and compresses washers 36a against the ends of springs 34a, 34b to thereby compress the springs. As a result, spring assembly 34 adjusts the load on piston 42 to increase or decrease the pressure effect on the piston. To adjust the effect of the spring assembly, adjustment member 36, which is threaded onto valve stem 18, may be turned about stem 18 to vary the compression on spring assembly 34 and adjust the load on the piston. Hence, the spring assembly and the piston provide an automatic pressure reducing system. As noted above, to limit the potential for valve stem 18 to rotate, piston 42 is rotationally coupled to member 38 and, hence, to body 12.

To optionally decouple this automatic pressure reducing function of the piston and the spring assembly, valve stem 18 of the present invention may include two stem portions—an outer stem member 60 and an inner stem member 62, which is guided by outer stem member 60 and sealed against the inner surface of member 60 by a seal 62a. Adjustment member 36, as noted above, is threaded onto stem 18 but at outer stem member 60 so that outer stem member 60 is coupled to the automatic pressure reducing system of valve 10.

In contrast, inner stem member 62, which is guided in outer stem member 60, is decoupled from the spring assembly, the adjustment member, and also the piston but coupled at its distal end to valve member 20. Inner stem member 62 is selectively coupled to handle 29 by handle stem 64, which is in threaded engagement with upper portion 28b of housing 28. Handle 29, which preferably comprises a hand wheel, is mounted to handle stem 64 by a fastener 29*a*, which is threaded into top 28*d* of housing, so that when handle 29 is rotated, handle stem 64 is urged into or out of housing 28. To limit the movement of handle stem 64 into housing, handle stem 64 includes a transverse pin 64*a*, which provides a stop. In addition, stem 64 may include a cup-shaped sleeve 64*b*, which also forms a stop to indicate when valve stem 64 is fully inserted into housing 28. When stem 64 is extended into housing 28, stem 64 contacts and urges inner valve stem portion 62 toward valve seat 22. The lower end of inner valve stem portion 62 is coupled to valve member 20 so that when valve stem portion 62 is pushed downward, as viewed in FIG. 4, valve member 20 is urged toward valve seat 22. In this manner, when handle 29 is rotated, inner stem member 62 can be manually urged downward (as viewed in FIG. 3) to urge valve member 20 against seat 22 without having to overcome the compression forces of spring assembly 34 or the pressure on piston 42.

In addition, valve 10 may include a supervisory switch 80, which includes a plunger or actuator 82 that contacts stem 64 of handle 29 to detect when the valve is open or closed. Stem 64 includes a cam surface, which compresses plunger 82 when stem 64 is in its retracted position, which indicates valve 10 is open. When handle 29 is rotated and stem 64 is extended into housing 28, plunger 82 rides on the cam surface, which allows plunger 82 to extend, which indicates valve 10 is closed.

Although described in reference to a pressure reducing valve that facilitates manual opening of the valve by decoupling the manual adjustment from the automatic pressure reducing system, the pressure reducing valve may have a conventional automatic pressure reducing system in which the valve stem is rigidly coupled to the handle and is acted upon by the spring assembly so that adjustment of the valve requires the user to manually compress or decompress the spring to vary the pressure at outlet 16.

Accordingly, the present invention provides a pressure reducing valve 10 that has a more compact arrangement, which saves costs and, further, provides for a valve that is easier to handle and has a greater range of application due to its more compact configuration.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A pressure reducing valve for coupling to a pressurized water supply line, said valve comprising:
    a valve body with an inlet for coupling to the pressurized water supply line, an outlet, a chamber, and a passage extending between said inlet and said outlet, said valve body having a valve seat in said passage between said inlet and said outlet;
    a valve stem extending into said passage, said valve stem having first and second valve stem portions coupled to a sealing member and a piston coupled to said first valve stem portion, said piston located in said chamber, the water pressure from said pressurized water supply line being directed to said chamber and applying pressure on said piston to apply a load on said first valve stem portion to urge said sealing member toward said valve seat to adjust the pressure at said outlet; and
    a spring assembly, said spring assembly comprising at least two parallel first and second springs coupled to said first valve stem portion and generating a spring force opposed to said pressure on said piston to adjust the load on said first valve stem portion and to thereby adjust the pressure at said outlet;
    further comprising a manual override system decoupled from said spring assembly and said piston, said manual override system coupled to said second valve stem portion for manually urging said sealing member toward said valve seat for closing said valve; and
    wherein said second valve stem portion is movable relative to said first valve stem portion and guided by said first valve stem portion.

2. The pressure reducing valve according to claim 1, wherein said first and second springs are nested.

3. The pressure reducing valve according to claim 2, wherein said first spring comprises a left-hand coiled inner spring, and said second spring comprises a right-hand coiled outer spring.

4. The pressure reducing valve according to claim 1, wherein each of said springs has a number of coils in the range of 4 to 7.

5. The pressure reducing valve according to claim 1, wherein each of said springs has an overall height in the range of about 2 to 5 inches.

6. The pressure reducing valve according to claim 5, wherein each of said springs has an overall height in the range of about 3.2 to 3.8 inches.

7. The pressure reducing valve according to claim 6, wherein said spring assembly generates a compression load in a range of about 1700 to 2300 lbs.

8. The pressure reducing valve according to claim 1, wherein said piston is rotationally coupled to said valve body.

9. The pressure reducing valve according to claim 8, wherein said piston is rotationally coupled to said valve body by a pair of pins.

10. The pressure reducing valve according to claim 1, wherein said manual override system includes a hand operable member, said hand operable member coupled to said second valve stem portion and being movable to urge said sealing member toward said valve seat, and wherein movement of said hand operable member is decoupled from said pressure on said piston and said spring force of said spring.

11. A pressure reducing valve for coupling to a pressurized water supply line, said valve comprising:
    a valve body with an inlet far coupling to the pressurized water supply line, an outlet, and a passage extending between said inlet and said outlet, said valve body having a valve seat in said passage between said inlet and said outlet;
    a valve stem extending into said passage, and said valve stem having a sealing member and including first and second valve stem portions coupled to said sealing member;
    an automatic pressure reducing system coupled to said first valve stem portion for urging said first valve stem portion and said sealing member toward said valve seat for throttling said valve to thereby reduce the pressure at said outlet, said automatic pressure reducing system comprises a piston mounted to said first valve stem portion, said valve further comprising a chamber, the water pressure from said pressurized water supply line being directed to said chamber and applying pressure on said piston to apply a load on said valve stem to urge said sealing member toward said valve seat to adjust the pressure at said outlet;

a manual override system coupled to said second valve stem portion for manually urging said second valve stem portion and said sealing member toward said valve seat for manually closing said valve;

said automatic pressure reducing system including nested springs, said nested springs being coupled to said first valve stem portion and generating a spring force opposed to said pressure on said piston to adjust the load on said first valve stem portion and to thereby adjust the pressure at said outlet; and wherein said second valve stem portion is movable relative to said first valve stem portion and guided by said first valve stem portion.

12. The pressure reducing valve according to claim 11, wherein said manual override system is decoupled from said pressure on said piston and said spring force or said spring assembly.

13. The pressure reducing valve according to claim 11, wherein said nested springs comprise a left-hand coiled inner spring and a right-hand coiled outer spring.

14. The pressure reducing valve according to claim 13, wherein said spring force is in a range of about 1700 to 2300 lbs.

15. The pressure reducing valve according to claim 14, wherein each of said springs has an overall height in a range of about 2 to 5 inches.

16. The pressure reducing valve according to claim 15, wherein each of said springs has a number of coils in a range of about 4 to 7.

17. A method of automatically adjusting the pressure of a pressure reducing valve, the valve having a valve body with an inlet for coupling to a pressurized water supply line, an outlet, a chamber, and a passage extending between the inlet and the outlet, the valve body having a valve seat between the inlet and the outlet, the valve further having a valve stem and the valve including an automatic pressure reducing system for urging the sealing member toward the valve seat for throttling the valve to thereby reduce the pressure at the outlet, the automatic pressure reducing system including a piston coupled to the valve stem and located in the chamber, water pressure being directed to the chamber and applying pressure to the piston to urge the sealing member toward the valve seal to adjust the pressure at the outlet, said method comprising:

generating a spring force with parallel springs; and applying the spring force to the piston to counteract the pressure on the piston to thereby adjust the pressure at the outlet; and manually urging the sealing member toward said valve seat by manipulating a hand operable member adapted to close the valve, wherein the hand operable member is decoupled from the spring force and the pressure on the piston.

18. The method according to claim 17, wherein said generating a spring force includes nesting the parallel springs.

19. The method according to claim 18, further comprising providing an adjustment mechanism for adjusting the spring force.

20. The method according to claim 19, further comprising rotationally coupling the valve stem to the valve body to reduce, if not eliminate, rotation of the valve stern when adjusting the spring force.

21. The method according to claim 20, wherein rotationally coupling includes rotationally coupling the piston to the valve body.

* * * * *

UNITED STATES PATENT AND TRADEMARK OFFICE
CERTIFICATE OF CORRECTION

PATENT NO. : 7,320,333 B2 Page 1 of 1
APPLICATION NO. : 11/124986
DATED : January 22, 2008
INVENTOR(S) : James M. Trapp and Eric Combs It is certified that error appears in the above-identified patent and that said Letters Patent is hereby corrected as shown below:

Column 8:
Line 48, Claim 11, "far" should be --for--.

Column 9:
Line 19, Claim 12, "or" should be --of--.

Column 10:
Line 29, Claim 20, "stern" should be --stem--.

Signed and Sealed this

Sixteenth Day of December, 2008

JON W. DUDAS
*Director of the United States Patent and Trademark Office*